United States Patent
Kim et al.

(10) Patent No.: US 12,386,549 B2
(45) Date of Patent: Aug. 12, 2025

(54) STORAGE DEVICE CONTROLLING WRITE BUFFER WHILE PROCESSING POWER OFF REQUEST AND METHOD OF OPERATING THE STORAGE DEVICE

(71) Applicant: SK hynix Inc., Icheon (KR)

(72) Inventors: Jin Sub Kim, Icheon (KR); Soon Hyun Kwon, Icheon (KR)

(73) Assignee: SK hynix Inc., Icheon (KR)

( * ) Notice: Subject to any disclaimer, the term of this patent is extended or adjusted under 35 U.S.C. 154(b) by 0 days.

(21) Appl. No.: 18/301,781

(22) Filed: Apr. 17, 2023

(65) Prior Publication Data

US 2024/0143222 A1 May 2, 2024

(30) Foreign Application Priority Data

Oct. 26, 2022 (KR) .................... 10-2022-0139380

(51) Int. Cl.
*G06F 3/06* (2006.01)
(52) U.S. Cl.
CPC .......... *G06F 3/0656* (2013.01); *G06F 3/0611* (2013.01); *G06F 3/064* (2013.01); *G06F 3/0673* (2013.01)
(58) Field of Classification Search
CPC ...... G06F 3/0656; G06F 3/0611; G06F 3/064; G06F 3/0673

USPC ......................................................... 711/154
See application file for complete search history.

(56) References Cited

U.S. PATENT DOCUMENTS

| | | | | |
|---|---|---|---|---|
| 10,747,444 | B2* | 8/2020 | Matsuyama | G06F 3/0659 |
| 11,586,385 | B1* | 2/2023 | Lercari | G06F 1/30 |
| 2017/0371794 | A1* | 12/2017 | Kan | G06F 3/061 |
| 2019/0354475 | A1* | 11/2019 | Choi | G06F 12/0238 |
| 2020/0073795 | A1* | 3/2020 | Asano | G06F 3/0656 |
| 2021/0073119 | A1* | 3/2021 | Amaki | G06F 3/0613 |
| 2023/0143181 | A1* | 5/2023 | Tan | G06F 3/0656 |
| | | | | 711/103 |

FOREIGN PATENT DOCUMENTS

KR          1020200132050 A       11/2020

* cited by examiner

*Primary Examiner* — Jared I Rutz
*Assistant Examiner* — Wei Ma

(57) ABSTRACT

A storage device may set a write buffer including one or more of a plurality of first type memory blocks. And the storage device may determine whether a threshold condition is satisfied when a power off request is received, and add one or more target memory blocks selected from among a plurality of second type memory blocks to the write buffer when it is determined that the threshold condition is satisfied.

10 Claims, 11 Drawing Sheets

STORAGE DEVICE CONTROLLING WRITE BUFFER WHILE PROCESSING POWER OFF REQUEST AND METHOD OF OPERATING THE STORAGE DEVICE

CROSS-REFERENCES TO RELATED APPLICATION

The present application claims priority under 35 U.S.C. 119(a) to Korean patent application number 10-2022-0139380 filed on Oct. 26, 2022, which are incorporated herein by reference in its entirety.

BACKGROUND

1. Technical Field

Various embodiments generally relate to a storage device controlling a write buffer while processing a power off request and a method of operating the storage device.

2. Related Art

A storage device is a device that stores data on the basis of a request of an external device such as a computer, a mobile terminal such as a smartphone or a tablet, or any of various other electronic devices.

The storage device may include a controller for controlling a memory (e.g., a volatile memory or a nonvolatile memory). The controller may receive a command from the external device, and may execute or control an operation of reading, writing, or erasing data with respect to the memory included in the storage device, in response to the received command.

Meanwhile, while the storage device is writing data to the memory, a power off request may be received from the outside of the storage device. In this case, the storage device needs to prevent the data, which is to be written to the memory, from being lost due to power off.

SUMMARY

Various embodiments are directed to a storage device capable of preventing data loss when power off occurs, and a method of operating the storage device.

In an embodiment, a storage device may include: i) a memory including a plurality of first type memory blocks and a plurality of second type memory blocks; and ii) a controller configured to set a write buffer including one or more of the first type memory blocks, the write buffer temporarily storing write data, determine whether a threshold condition is satisfied when a power off request is received, and add one or more target memory blocks selected from among the second type memory blocks to the write buffer when it is determined that the threshold condition is satisfied.

In an embodiment, a method for operating a storage device may include: i) receiving a power off request, ii) determining whether a threshold condition is satisfied when the power off request is received, iii) when it is determined that the threshold condition is satisfied, adding one or more target memory blocks to a write buffer that includes a plurality of first type memory blocks, the one or more target memory blocks being selected from among a plurality of second type memory blocks, and iv) storing write data in the write buffer.

In an embodiment, a controller may include: i) a memory interface configured to communicate with memory including a plurality of first type memory blocks and a plurality of second type memory blocks, and ii) a control circuit configured to set a write buffer including one or more of the first type memory blocks, the write buffer temporarily storing write data from an external device, determine whether a threshold condition is satisfied when a power off request is received, and when it is determined that the threshold condition is satisfied, add one or more target memory blocks selected from among the second type memory blocks to the write buffer.

According to the embodiments of the present disclosure, it is possible to prevent data loss when power off occurs.

DETAIL DESCRIPTION OF THE EXEMPLARY EMBODIMENTS

Figure 1:
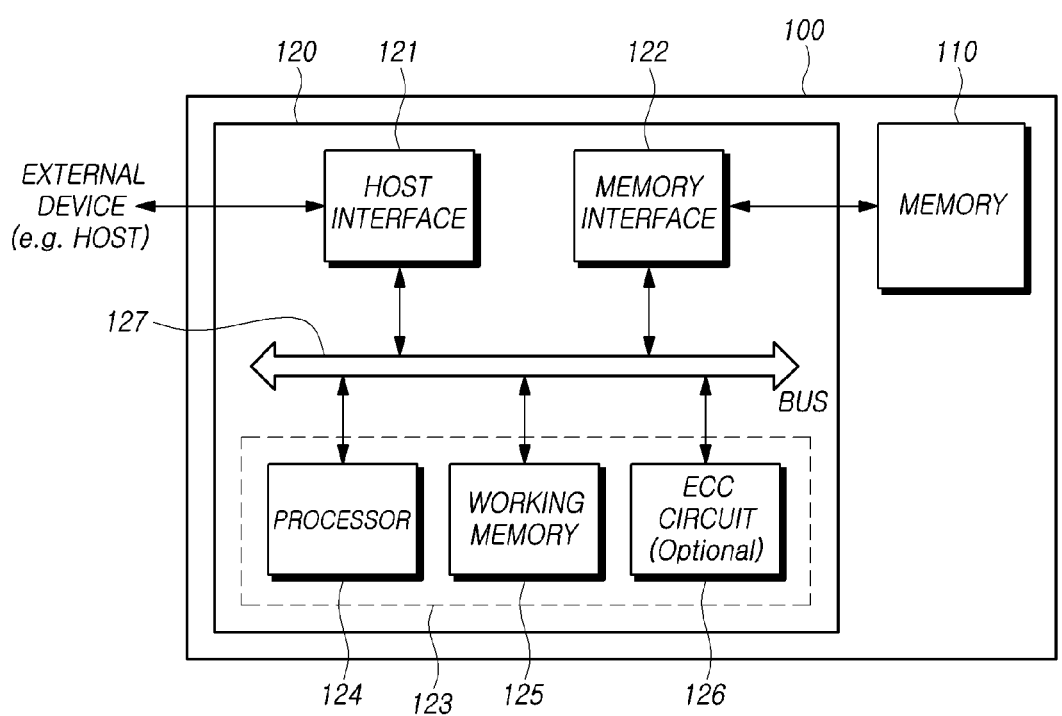
FIG. 1 illustrates a storage device according to an embodiment of the present disclosure.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the present disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be those described herein or one in addition to the elements described herein. Because the algorithms that form the basis of the methods (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented at least partially in software, the controllers, processors, devices, modules, units, multiplexers, logic, interfaces, decoders, drivers, generators and other signal generating and signal processing features may include, for example, a memory or other storage device for storing code or instructions to be executed, for example, by a computer, processor, microprocessor, controller, or other signal processing device.

FIG. 1 illustrates a storage device 100 according to an embodiment of the present disclosure.

Referring to FIG. 1, the storage device 100 may include a memory 110 that stores data and a controller 120 that controls the memory 110.

The memory 110 includes a plurality of memory blocks, and operates under the control of the controller 120. Operations of the memory 110 may include a read operation, a program operation (also referred to as a write operation), and an erase operation.

The memory 110 may include a memory cell array including a plurality of memory cells (also simply referred to as "cells") that store data. Such a memory cell array may exist in a memory block.

For example, the memory 110 may be realized in various types of memory such as a DDR SDRAM (double data rate synchronous dynamic random access memory), an LPDDR4 (low power double data rate 4) SDRAM, a GDDR (graphics double data rate) SDRAM, an LPDDR (low power DDR), an RDRAM (Rambus dynamic random access memory), a NAND flash memory, a 3D NAND flash memory, a NOR flash memory, a resistive random access memory (RRAM), a phase-change memory (PRAM), a magnetoresistive random access memory (MRAM), a ferroelectric random access memory (FRAM) and a spin transfer torque random access memory (STT-RAM).

The memory 110 may be implemented as a three-dimensional array structure. For example, embodiments of the present disclosure may be applied to a charge trap flash (CTF) in which a charge storage layer is configured by a dielectric layer and a flash memory in which a charge storage layer is configured by a conductive floating gate.

The memory 110 may receive a command and an address from the controller 120 and may access an area in the memory cell array that is selected by the address. In other words, the memory 110 may perform an operation indicated by the command, on the area selected by the address.

The memory 110 may perform a program operation, a read operation, or an erase operation. For example, when performing the program operation, the memory 110 may program data to the area selected by the address. When performing the read operation, the memory 110 may read data from the area selected by the address. In the erase operation, the memory 110 may erase data stored in the area selected by the address.

The controller 120 may control write (or program), read, erase, and background operations for the memory 110. For example, background operations may include at least one from among a garbage collection (GC) operation, a wear leveling (WL) operation, a read reclaim (RR) operation, a bad block management (BBM) operation, and so forth.

The controller 120 may control the operation of the memory 110 according to a request from a device (e.g., a host) located outside the storage device 100. The controller 120, however, also may control the operation of the memory 110 regardless of or in the absence of a request of the host.

The host may be a computer, an ultra mobile PC (UMPC), a workstation, a personal digital assistant (PDA), a tablet, a mobile phone, a smartphone, an e-book, a portable multimedia player (PMP), a portable game player, a navigation device, a black box, a digital camera, a digital multimedia broadcasting (DMB) player, a smart television, a digital audio recorder, a digital audio player, a digital picture recorder, a digital picture player, a digital video recorder, a digital video player, a storage configuring a data center, one of various electronic devices configuring a home network, one of various electronic devices configuring a computer network, one of various electronic devices configuring a telematics network, an RFID (radio frequency identification) device, and a mobility device (e.g., a vehicle, a robot or a drone) capable of driving under human control or autonomous driving, as non-limiting examples.

The host may include at least one operating system (OS). The operating system may generally manage and control the function and operation of the host, and may provide interoperability between the host and the storage device 100. The operating system may be classified into a general operating system and a mobile operating system depending on the mobility of the host.

The controller 120 and the host may be devices that are separated from each other, or the controller 120 and the host may be integrated into one device. Hereunder, for the sake of convenience in explanation, the controller 120 and the host will be described as devices that are separated from each other.

Referring to FIG. 1, the controller 120 may include a memory interface 122 and a control circuit 123, and may further include a host interface 121.

The host interface 121 provides an interface for communication with the host. For example, the host interface 121 provides an interface that uses at least one from among various interface protocols such as a USB (universal serial bus) protocol, an MMC (multimedia card) protocol, a PCI (peripheral component interconnection) protocol, a PCI-E (PCI-express) protocol, an ATA (advanced technology attachment) protocol, a serial-ATA protocol, a parallel-ATA protocol, an SCSI (small computer system interface) protocol, an ESDI (enhanced small disk interface) protocol, an IDE (integrated drive electronics) protocol, and a private protocol.

When receiving a command from the host, the control circuit 123 may receive the command through the host interface 121, and may perform an operation of processing the received command.

The memory interface 122 may be coupled with the memory 110 to provide an interface for communication with the memory 110. That is to say, the memory interface 122 may be configured to provide an interface between the memory 110 and the controller 120 under the control of the control circuit 123.

The control circuit 123 performs the general control operations of the controller 120 to control the operation of the memory 110. To this end, for instance, the control circuit 123 may include at least one of a processor 124 and a working memory 125, and may optionally include an error detection and correction circuit (ECC circuit) 126.

The processor 124 may control general operations of the controller 120, and may perform a logic calculation. The processor 124 may communicate with the host through the host interface 121, and may communicate with the memory 110 through the memory interface 122.

The processor 124 may perform the function of a flash translation layer (FTL). The processor 124 may translate a logical block address (LBA), provided by the host, into a physical block address (PBA) through the flash translation layer (FTL). The flash translation layer (FTL) may receive the logical block address (LBA) and translate the logical block address (LBA) into the physical block address (PBA), by using a mapping table.

There are various address mapping methods of the flash translation layer, depending on a mapping unit. Representative address mapping methods include a page mapping method, a block mapping method and a hybrid mapping method.

The processor 124 may randomize data received from the host. For example, the processor 124 may randomize data received from the host by using a set randomizing seed. The randomized data may be provided to the memory 110, and may be programmed to a memory cell array of the memory 110.

In a read operation, the processor 124 may derandomize data received from the memory 110. For example, the processor 124 may derandomize data received from the memory 110 by using a derandomizing seed. The derandomized data may be outputted to the host.

The processor 124 may execute firmware to control the operation of the controller 120. Namely, in order to control the general operation of the controller 120 and perform a logic calculation, the processor 124 may execute (or drive) firmware loaded in the working memory 125 upon booting of the storage device 100. Hereafter, an operation of the storage device 100 according to embodiments of the present disclosure will be described as implementing a processor 124 that executes firmware in which the corresponding operation is defined.

Firmware, as a program to be executed in the storage device 100 to drive the storage device 100, may include various functional layers. For example, the firmware may include binary data in which codes for executing the functional layers, respectively, are defined.

For example, the firmware may include at least one from among a flash translation layer (FTL), which performs a translating function between a logical address requested to the storage device 100 from the host and a physical address of the memory 110; a host interface layer (HIL), which serves to analyze a command requested to the storage device 100 as a storage device from the host and transfer the command to the flash translation layer (FTL); and a flash interface layer (FIL), which transfers a command, instructed from the flash translation layer (FTL), to the memory 110.

Such firmware may be loaded in the working memory 125 from, for example, the memory 110 or a separate nonvolatile memory (e.g., a ROM or a NOR Flash) located outside the memory 110. The processor 124 may first load all or a part of the firmware in the working memory 125 when executing a booting operation after power-on.

The processor 124 may perform a logic calculation, which is defined in the firmware loaded in the working memory 125, to control the general operation of the controller 120. The processor 124 may store a result of performing the logic calculation defined in the firmware, in the working memory 125. The processor 124 may control the controller 120 according to a result of performing the logic calculation defined in the firmware such that the controller 120 generates a command or a signal. When a part of firmware in which a logic calculation to be performed is defined is stored in the memory 110, but not loaded in the working memory 125, the processor 124 may generate an event (e.g., an interrupt) for loading the corresponding part of the firmware into the working memory 125 from the memory 110.

The processor 124 may load metadata necessary for driving firmware from the memory 110. The metadata, as data for managing the memory 110, may include management information on user data stored in the memory 110.

Firmware may be updated while the storage device 100 is manufactured or while the storage device 100 is operating. The controller 120 may download new firmware from the outside of the storage device 100 and update existing firmware with the new firmware.

To drive the controller 120, the working memory 125 may store necessary firmware, a program code, a command, and data. The working memory 125 may be a volatile memory that includes, for example, at least one from among an SRAM (static RAM), a DRAM (dynamic RAM), and an SDRAM (synchronous DRAM).

The error detection and correction circuit 126 may detect an error bit of target data, and correct the detected error bit by using an error correction code. The target data may be data stored in the working memory 125 or data read from the memory 110.

The error detection and correction circuit 126 may decode data by using an error correction code. The error detection and correction circuit 126 may be realized by various code decoders. For example, a decoder that performs unsystematic code decoding or a decoder that performs systematic code decoding may be used.

For example, the error detection and correction circuit 126 may detect an error bit by the unit of a set sector in each of read data when each read data is constituted by a plurality of sectors. A sector may be a data unit that is smaller than a page that is the read unit of a flash memory. Sectors constituting each read data may be matched with one another using an address.

The error detection and correction circuit 126 may calculate a bit error rate (BER), and may determine whether an error is correctable or not, by sector units. For example, when the bit error rate (BER) is higher than a reference value, the error detection and correction circuit 126 may determine that a corresponding sector is uncorrectable or failed. On the other hand, when the bit error rate (BER) is lower than the reference value, the error detection and correction circuit 126 may determine that a corresponding sector is correctable or passed.

The error detection and correction circuit 126 may perform an error detection and correction operation sequentially for all read data. When a sector included in read data is correctable, the error detection and correction circuit 126 may omit an error detection and correction operation for a corresponding sector of next read data. If the error detection and correction operation for all read data is completed in this way, there may be one or more sectors that are determined to be uncorrectable. The error detection and correction circuit 126 may transfer information (e.g., address information) regarding the one or more sectors that are determined to be uncorrectable to the processor 124.

A bus 127 may be configured to provide channels among the components 121, 122, 124, 125, and 126 of the controller 120. The bus 127 may include a control bus for transferring various control signals, commands, and the like, a data bus for transferring various data, and so forth.

Some components among the above-described components 121, 122, 124, 125, and 126 of the controller 120 may be omitted, or some components among the above-described components 121, 122, 124, 125, and 126 of the controller 120 may be integrated into one component. In addition to the above-described components 121, 122, 124, 125, and 126 of the controller 120, one or more other components may be added to the controller 120.

Hereinbelow, the memory 110 will be described in further detail with reference to FIG. 2.

Figure 2:
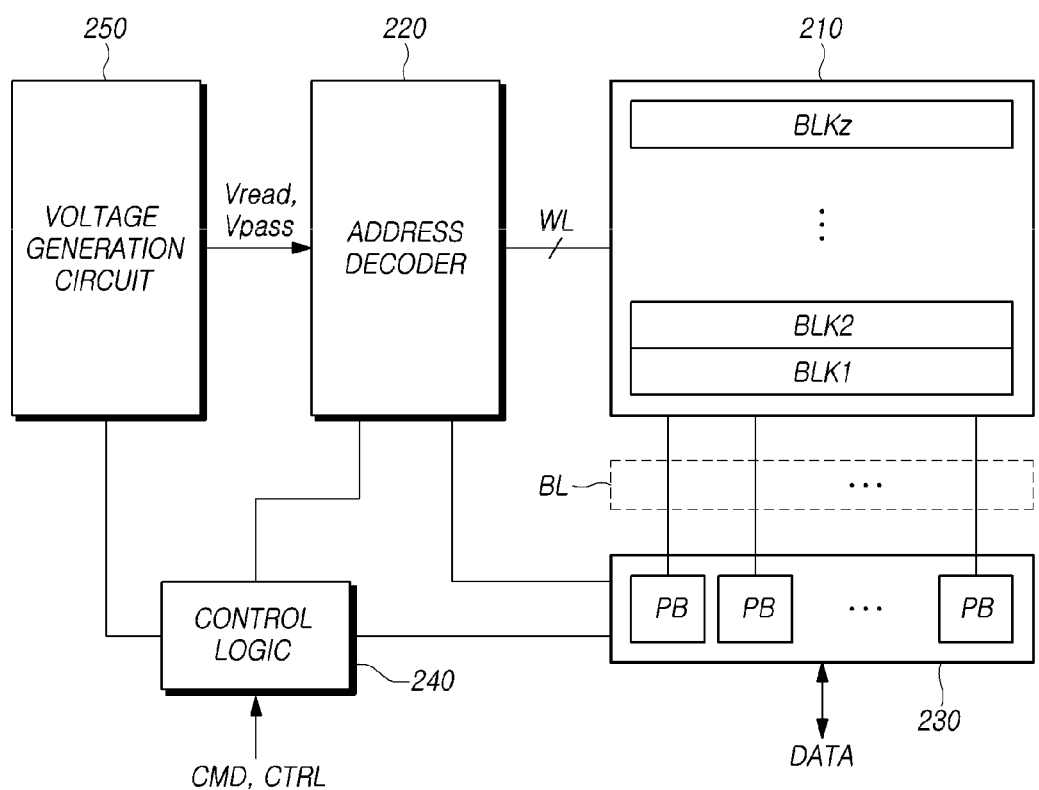
FIG. 2 illustrates a memory of FIG. 1.

FIG. 2 illustrates the memory 110 of FIG. 1.

Referring to FIG. 2, the memory 110 may include a memory cell array 210, an address decoder 220, a read and write circuit 230, a control logic 240, and a voltage generation circuit 250.

The memory cell array 210 may include a plurality of memory blocks BLK1 to BLKz (where z is a natural number of 2 or greater).

In the plurality of memory blocks BLK1 to BLKz, a plurality of word lines WL, and a plurality of bit lines BL may be disposed, and a plurality of memory cells (MC) may be arranged.

The plurality of memory blocks BLK1 to BLKz may be coupled with the address decoder 220 through the plurality of word lines WL. The plurality of memory blocks BLK1 to BLKz may be coupled with the read and write circuit 230 through the plurality of bit lines BL.

Each of the plurality of memory blocks BLK1 to BLKz may include a plurality of memory cells. For example, the plurality of memory cells may be nonvolatile memory cells, and may have a vertical channel structure.

The memory cell array 210 may be configured by a memory cell array of a two-dimensional structure or a three-dimensional structure.

Each of the plurality of memory cells included in the memory cell array 210 may store at least 1-bit data. For instance, each of the plurality of memory cells included in the memory cell array 210 may be a signal level cell (SLC) that stores 1-bit data. In another instance, each of the plurality of memory cells included in the memory cell array 210 may be a multi-level cell (MLC) that stores 2-bit data. In still another instance, each of the plurality of memory cells included in the memory cell array 210 may be a triple level cell (TLC) that stores 3-bit data. In yet another instance, each of the plurality of memory cells included in the memory cell array 210 may be a quad level cell (QLC) that stores 4-bit data. In a further instance, the memory cell array 210 may include a plurality of memory cells, each of which stores 5 or more-bit data.

The number of bits of data stored in each of the plurality of memory cells may be dynamically determined.

Referring to FIG. 2, the address decoder 220, the read and writhe circuit 230, the control logic 240, and the voltage generation circuit 250 may operate as a peripheral circuit that drives the memory cell array 210.

The address decoder 220 may be coupled to the memory cell array 210 through the plurality of word lines WL.

The address decoder 220 may be configured to operate under the control of the control logic 240.

The address decoder 220 may receive an address through an input/output buffer in the memory 110. The address decoder 220 may be configured to decode a block address in the received address. The address decoder 220 may select at least one memory block depending on the decoded block address.

The address decoder 220 may receive a read voltage Vread and a pass voltage Vpass from the voltage generation circuit 250.

The address decoder 220 may apply the read voltage Vread to a selected word line WL in a selected memory block during a read operation, and may apply the pass voltage Vpass to the remaining unselected word lines WL.

The address decoder 220 may apply a verify voltage generated in the voltage generation circuit 250 to a selected word line WL in a selected memory block in a program verify operation, and may apply the pass voltage Vpass to the remaining unselected word lines WL.

The address decoder 220 may be configured to decode a column address in the received address. The address decoder 220 may transmit the decoded column address to the read and write circuit 230.

A read operation and a program operation of the memory 110 may be performed by the unit of a page. An address received when a read operation or a program operation is requested may include at least one from among a block address, a row address, and a column address.

The address decoder 220 may select one memory block and one word line depending on a block address and a row address. A column address may be decoded by the address decoder 220 and be provided to the read and write circuit 230.

The address decoder 220 may include at least one from among a block decoder, a row decoder, a column decoder, and an address buffer.

The read and write circuit 230 may include a plurality of page buffers PB. The read and write circuit 230 may operate as a read circuit in a read operation of the memory cell array 210, and may operate as a write circuit in a write operation of the memory cell array 210.

The read and write circuit 230 described above may also be referred to as a page buffer circuit or a data register circuit that includes a plurality of page buffers PB. The read and write circuit 230 may include data buffers that take charge of a data processing function, and may further include cache buffers that take charge of a caching function.

The plurality of page buffers PB may be coupled to the memory cell array 210 through the plurality of bit lines BL. The plurality of page buffers PB may continuously supply sensing current to bit lines BL coupled with memory cells to sense threshold voltages (Vth) of the memory cells in a read operation. In a program verify operation, the plurality of page buffers PB may latch data read by sensing, through sensing nodes, changes in amounts of current flowing through memory cells depending on programmed states of the memory cells.

The read and write circuit 230 may operate in response to page buffer control signals outputted from the control logic 240.

In a read operation, the read and write circuit 230 temporarily stores read data by sensing data of memory cells, and then, outputs data DATA to the input/output buffer of the memory 110. In an embodiment, the read and write circuit 230 may include a column select circuit in addition to the page buffers PB or the page registers.

The control logic 240 may be coupled with the address decoder 220, the read and write circuit 230, and the voltage generation circuit 250. The control logic 240 may receive a command CMD and a control signal CTRL through the input/output buffer of the memory 110.

The control logic 240 may be configured to control general operations of the memory 110 in response to the control signal CTRL. The control logic 240 may output control signals for adjusting the precharge potential levels of the sensing nodes of the plurality of page buffers PB.

The control logic 240 may control the read and write circuit 230 to perform a read operation of the memory cell array 210. The voltage generation circuit 250 may generate the read voltage Vread and the pass voltage Vpass used in a read operation, in response to a voltage generation circuit control signal output from the control logic 240.

Each memory block of the memory 110 described above may be configured by a plurality of pages corresponding to a plurality of word lines WL and a plurality of strings corresponding to a plurality of bit lines BL.

In a memory block BLK, a plurality of word lines WL and a plurality of bit lines BL may be disposed to intersect with each other. For example, each of the plurality of word lines WL may be disposed in a row direction, and each of the plurality of bit lines BL may be disposed in a column direction. Alternatively, each of the plurality of word lines WL may be disposed in a column direction, and each of the plurality of bit lines BL may be disposed in a row direction.

A memory cell may be coupled to one of the plurality of word lines WL and one of the plurality of bit lines BL. A transistor may be disposed in each memory cell.

For example, a transistor disposed in each memory cell (MC) may include a drain, a source, and a gate. The drain (or source) of the transistor may be coupled with a corresponding bit line BL directly or via another transistor. The source (or drain) of the transistor may be coupled with a source line (which may be the ground) directly or via another transistor. The gate of the transistor may include a floating gate, which is surrounded by a dielectric, and a control gate to which a gate voltage is applied from a word line WL.

In each memory block, a first selection line (also referred to as a source selection line or a drain selection line) may be additionally disposed outside a first outermost word line more adjacent to the read and write circuit 230 between two outermost word lines, and a second selection line (also referred to as a drain selection line or a source selection line) may be additionally disposed outside a second outermost word line between the two outermost word lines.

At least one dummy word line may be additionally disposed between the first outermost word line and the first selection line. At least one dummy word line may also be additionally disposed between the second outermost word line and the second selection line.

A read operation and a program operation (or write operation) of the memory block described above may be performed by the unit of a page, and an erase operation may be performed by the unit of a memory block.

Figure 3:
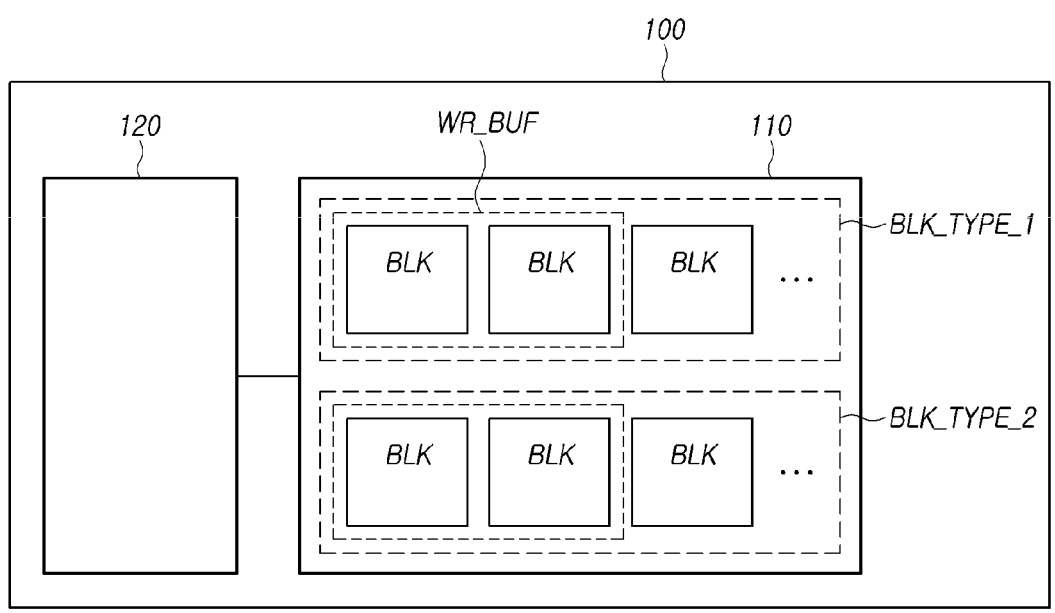
FIG. 3 illustrates a storage device according to an embodiment of the present disclosure.

FIG. 3 illustrates a storage device 100 according to an embodiment of the present disclosure.

Referring to FIG. 3, the storage device 100 may include a memory 110 and a controller 120.

The memory 110 may include a plurality of memory blocks BLK. The plurality of memory blocks BLK may include first type memory blocks BLK_TYPE_1 and second type memory blocks BLK_TYPE_2. Therefore, the memory 110 may include a plurality of first type memory blocks BLK_TYPE_1 and a plurality of second type memory blocks BLK_TYPE_2.

The controller 120 may dynamically classify a memory block BLK into a first type memory block BLK_TYPE_1 or a second type memory block BLK_TYPE_2. That is, the first type memory block BLK_TYPE_1 and the second type memory block BLK_TYPE_2 may be switched to each other. For example, the first type memory block BLK_TYPE_1 may be changed to the second type memory block BLK_TYPE_2, or vice versa.

In an embodiment of the present disclosure, the plurality of memory blocks BLK may be classified into the first type memory blocks BLK_TYPE_1 and the second type memory blocks BLK_TYPE_2 according to an operating speed.

For example, the second type memory blocks BLK_TYPE_2 may operate at a higher speed than the first type memory blocks BLK_TYPE_1. In this case, the storage capacity of the second type memory blocks BLK_TYPE_2 may be less than the storage capacity of the first type memory blocks BLK_TYPE_1.

For example, the first type memory blocks BLK_TYPE_1 may be MLC, TLC, or QLC memory blocks, and the second type memory blocks BLK_TYPE_2 may be SLC memory blocks.

In FIG. 3, the controller 120 may set a write buffer WR_BUF to include one or more of the first type memory blocks BLK_TYPE_1. Data requested to be written in the memory 110 by an external device, e.g., host, may be written to the write buffer WR_BUF. Hereinafter, an operation of writing data to the write buffer WR_BUF will be described with reference to FIG. 4.

Meanwhile, the controller 120 may add one or more memory blocks to the write buffer WR_BUF in a specific situation. Hereinafter, adding the one or more memory blocks to the write buffer WR_BUF will be described with reference to FIG. 5.

Figure 4:
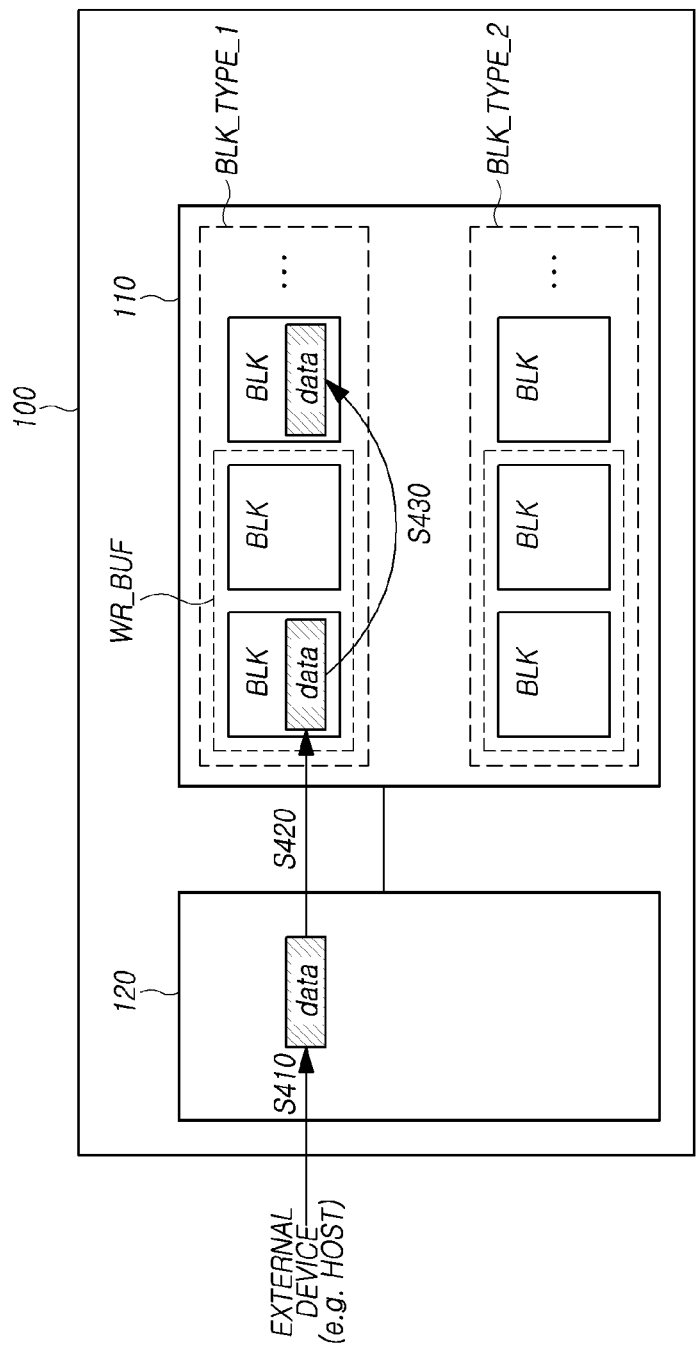
FIG. 4 illustrates an operation of storing write data in a write buffer according to an embodiment of the present disclosure.

FIG. 4 illustrates an operation of writing data to a write buffer WR_BUF according to an embodiment of the present disclosure. The operation of FIG. 4 may be performed in the storage device 100 of FIG. 3.

Referring to FIG. 4, the controller 120 of the storage device 100 may receive write data from an external device, e.g., a host (S410), and write the received write data to the write buffer WR_BUF (S420).

After that, the write data stored in the write buffer WR_BUF may be migrated to other memory blocks included in the memory 110 (S430). After the write data is migrated to the other memory blocks, the write data stored in the write buffer WR_BUF may be deleted from the write buffer WR_BUF.

In embodiments of the present disclosure, in order to prevent loss of the write data, the storage device 100 temporarily stores the write data in the write buffer WR_BUF.

However, if an operation of storing the write data in the write buffer WR_BUF is delayed in a specific situation, the write data may be finally lost.

For example, when the storage device 100 receives a power off request from the outside, the storage device 100 should complete the operation of storing the write data in the write buffer WR_BUF before entering a power off state.

However, when the operation of migrating data stored in the write buffer WR_BUF is delayed due to an insufficient number of free memory blocks included in the memory 110, the operation of storing the write data in the write buffer WR_BUF may be also delayed because a free space in the write buffer WR_BUF may be insufficient.

In this case, if the storage device 100 enters the power off state before the write data is stored in the write buffer WR_BUF, the write data may be lost. If the write data is lost, data mismatch may occur when the storage device 100 is powered on later.

In order to avoid the data mismatch, the storage device 100 may determine whether a threshold condition is satisfied when the power off request is received from the outside. When it is determined that the threshold condition is satisfied, the storage device 100 may increase the size of the write buffer WR_BUF to store write data more quickly. Through this, the storage device 100 may store all write data in the write buffer WR_BUF before entering the power off state.

Figure 5:
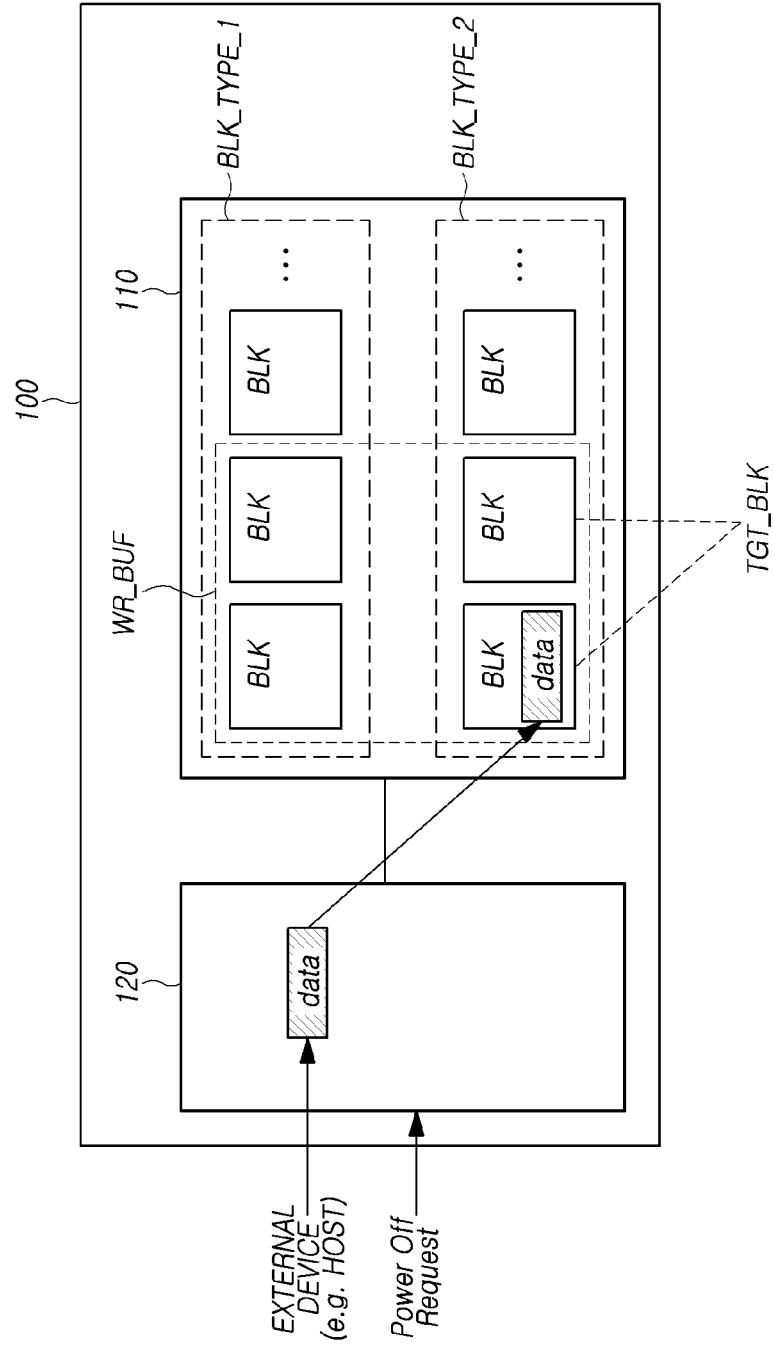
FIG. 5 illustrates an operation executed when a storage device receives a power off request according to an embodiment of the present disclosure.

FIG. 5 illustrates an operation executed when the storage device 100 of FIG. 3 receives the power off request according to an embodiment of the present disclosure.

In FIG. 5, the controller 120 of the storage device 100 may determine whether the threshold condition is satisfied when the power off request is received from the outside.

The controller 120 may select one or more target memory blocks TGT_BLK and add the selected one or more target memory blocks TGT_BLK to the write buffer WR_BUF when the threshold condition is satisfied. In this case, the target memory blocks TGT_BLK may be selected from among the second type memory blocks BLK_TYPE_2.

By increasing the size of the write buffer WR_BUF in this way, the controller 120 may prevent an operation of storing write data in the write buffer WR_BUF from being delayed due to an insufficient free space of the write buffer WR_BUF.

Also, since the second type memory blocks BLK_TYPE_2 operate at a higher speed than the first type memory blocks BLK_TYPE_1, the controller 120 may store the write data in the write buffer WR_BUF more quickly.

Through this, the controller 120 may complete the operation of temporarily storing the write data in the write buffer WR_BUF before entering the power off state.

Figure 6:
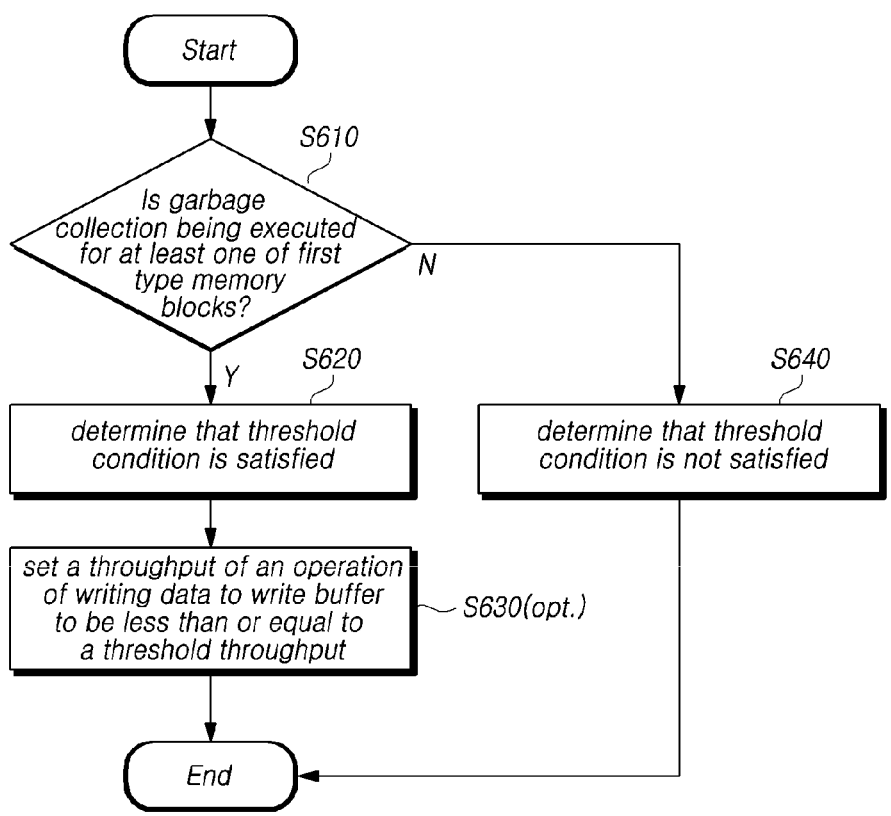
FIG. 6 is a flowchart illustrating an operation of determining whether a threshold condition is satisfied according to an embodiment of the present disclosure.

FIG. 6 is a flowchart illustrating an operation of determining whether the threshold condition is satisfied according to an embodiment of the present disclosure. The operation of FIG. 6 may be performed by the storage device 100 of FIG. 3.

The controller 120 of the storage device 100 may determine whether garbage collection is being executed for at least one of the first type memory blocks BLK_TYPE_1 (S610). For example, when the number of free memory blocks among the first type memory blocks BLK_TYPE_1 is less than or equal to a threshold number, the controller 120 may execute the garbage collection on at least one of the first type memory blocks BLK_TYPE_1.

When the garbage collection is being executed for at least one of the first type memory blocks BLK_TYPE_1 (S610-Y), the controller 120 may determine that the threshold condition is satisfied (S620). This is because the operation of migrating data stored in the write buffer WR_BUF to other memory blocks in the memory 110 may be delayed when the number of free memory blocks in which data can be stored is less than or equal to the threshold number. Also when the garbage collection is being executed, an operation of storing write data in the write buffer WR_BUF may be also delayed.

After it is determined that the threshold condition is satisfied at S620, the controller 120 may selectively set a throughput of an operation of writing data to the write buffer WR_BUF to be less than or equal to a threshold throughput (S630). That is, the controller 120 may limit a speed of writing data to the write buffer WR_BUF to be less than or equal to a threshold speed. This is for the controller 120 to execute the garbage collection to secure free memory blocks more quickly.

On the other hand, when the garbage collection is not executed for the first type memory blocks BLK_TYPE_1 (S610-N), the controller 120 may determine that the threshold condition is not satisfied (S640).

Meanwhile, the controller 120 may determine whether the threshold condition is satisfied or not by a method that is different from the method described in FIG. 6. In another embodiment, the controller 120 may determine that the threshold condition is satisfied when the garbage collection is being executed for at least one of the first type memory blocks BLK_TYPE_1 and the second type memory blocks BLK_TYPE_2. In still another embodiment, the controller 120 may determine that the threshold condition is satisfied when a background operation (e.g., wear leveling or read reclaim) other than the garbage collection is being executed for at least one of the first type memory blocks BLK_TYPE_1 and the second type memory blocks BLK_TYPE_2. In further still another embodiment, the controller 120 may determine that the threshold condition is satisfied when the size of a free space in the write buffer WR_BUF is less than or equal to threshold size.

Hereinafter, specific embodiments in which the storage device 100 selects the target memory blocks TGT_BLK described in FIG. 5 will be described.

Figure 7:
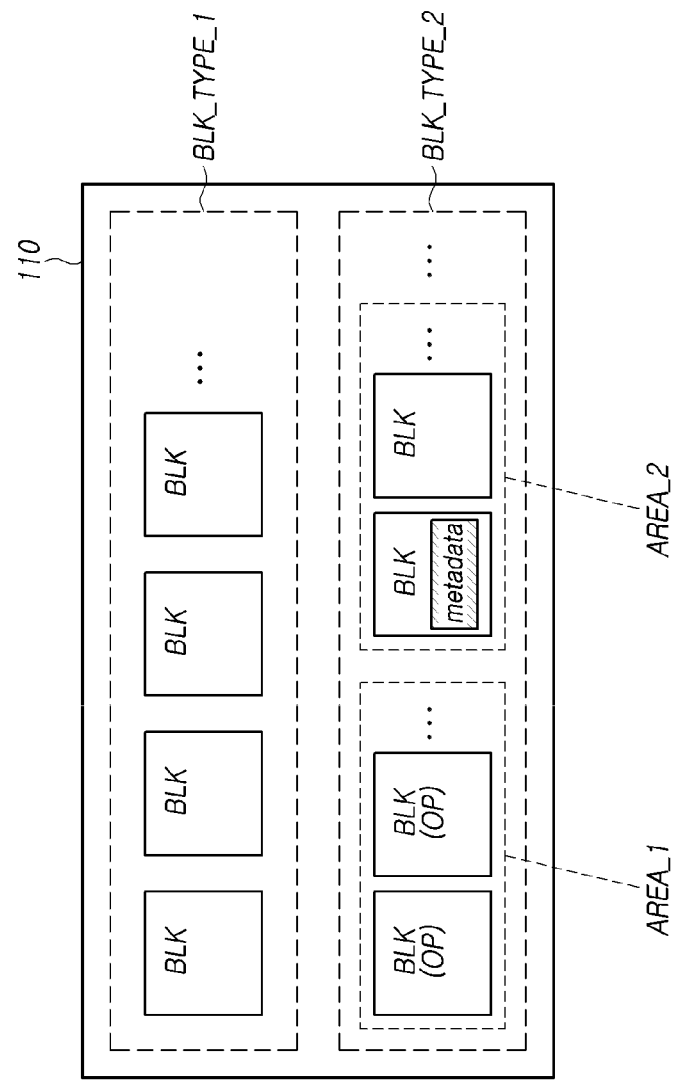
FIG. 7 illustrates a first memory area and a second memory area according to an embodiment of the present disclosure.

FIG. 7 illustrates a first memory area AREA_1 and a second memory area AREA_2 according to an embodiment of the present disclosure. The first memory area AREA_1 and the second memory area AREA_2 may be included in the memory 110 of FIG. 3.

Referring to FIG. 7, the first memory area AREA_1 may include over-provisioning (OP) memory blocks among the second type memory blocks BLK_TYPE_2. An over-provisioning memory block may be an extra memory block for replacing a bad memory block or executing a background operation (e.g., garbage collection or wear leveling). When the storage device 100 is initialized, the over-provisioning memory blocks may not be allocated to any of an area for storing user data and an area for storing meta data. That is, the over-provisioning memory blocks may be reserved for other purposes such as the replacement of the bad memory block or the executing of the background operation.

The second memory area AREA_2 may include memory blocks, in which meta data is to be stored, among the second type memory blocks BLK_TYPE_2.

In embodiments of the present disclosure, the controller 120 of the storage device 100 may select the target memory blocks TGT_BLK from among memory blocks included in at least one of the first memory area AREA_1 and the second memory area AREA_2.

Figure 8:
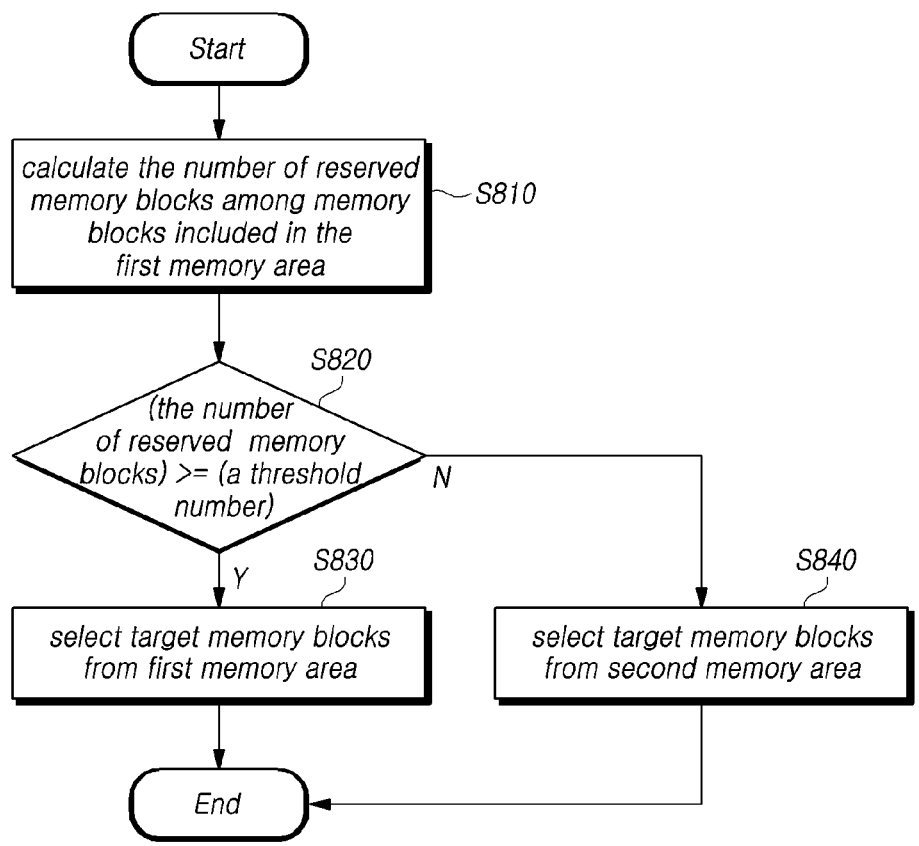
FIG. 8 is a flowchart illustrating an operation of selecting target memory blocks according to an embodiment of the present disclosure.

FIG. 8 is a flowchart illustrating an operation of selecting target memory blocks according to an embodiment of the present disclosure. The operation of FIG. 8 will be described with reference to FIG. 7.

Referring to FIG. 8, the controller 120 of the storage device 100 may calculate the number of reserved memory blocks among memory blocks included in the first memory area AREA_1 (S810). In this case, the reserved memory blocks may be in a state that they have not been replaced with bad memory blocks. And the reserved memory blocks may be free memory blocks in which data can be stored.

The controller 120 may determine whether the number of reserved memory blocks calculated at S810 is greater than or equal to a threshold number (S820).

When the number of reserved memory blocks is greater than or equal to the threshold number (S820-Y), the controller 120 may select the target memory blocks TGT_BLK from the first memory area AREA_1 (S830). This is because there are enough reserved memory blocks in the first memory area AREA_1 so that some of the memory blocks included in the first memory area AREA_1 can be used for the write buffer WR_BUF.

On the other hand, when the number of reserved memory blocks is less than the threshold number (S820-N), the controller 120 may select the target memory blocks TGT_BLK from the second memory area AREA_2 (S840). This is because, when an additional bad memory block is generated while using a memory block included in the first memory area AREA_1 for the write buffer WR_BUF, a memory block to replace the bad memory block may not be secured from the first memory area AREA_1.

Figure 9:
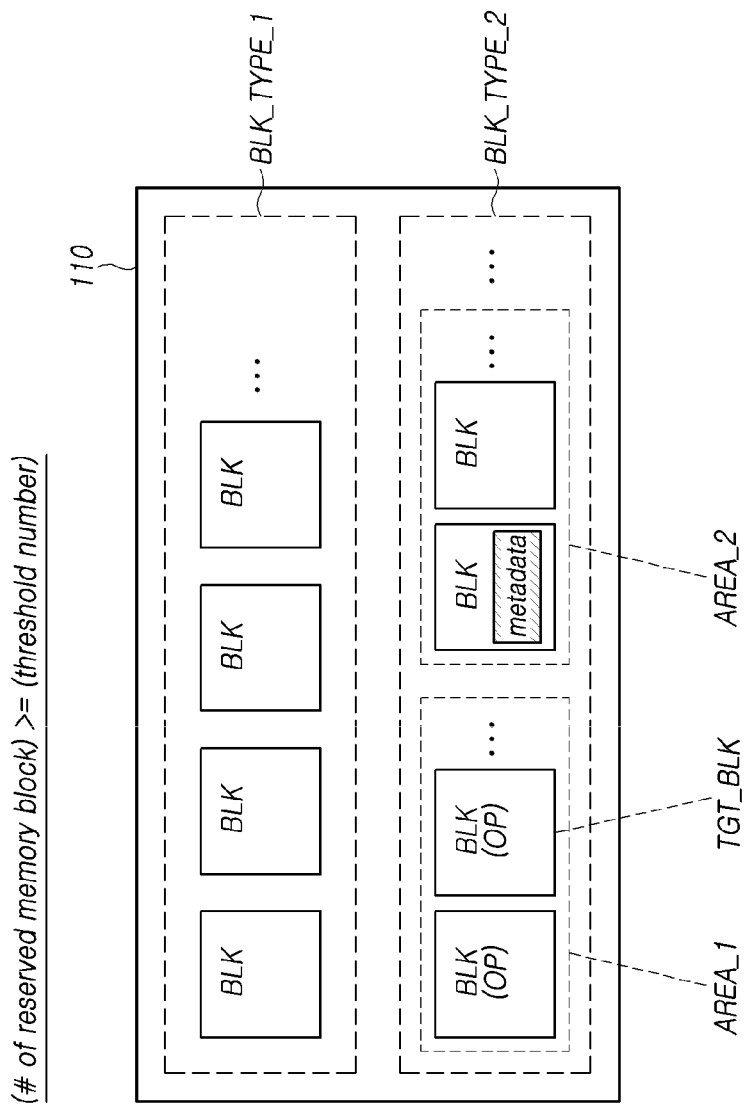
FIG. 9 illustrates an operation of selecting target memory blocks from a first memory area according to an embodiment of the present disclosure.

FIG. 9 illustrates an operation of selecting the target memory blocks TGT_BLK from the first memory area AREA_1 according to an embodiment of the present disclosure.

Referring to FIG. 9, when the number of reserved memory blocks described in FIG. 8 is greater than or equal to the threshold number, the controller 120 of the storage device 100 may select the target memory blocks TGT_BLK from among the memory blocks included in the first memory area AREA_1.

At this time, the target memory blocks TGT_BLK may be available reserved memory blocks in the first memory area AREA_1.

Figure 10:
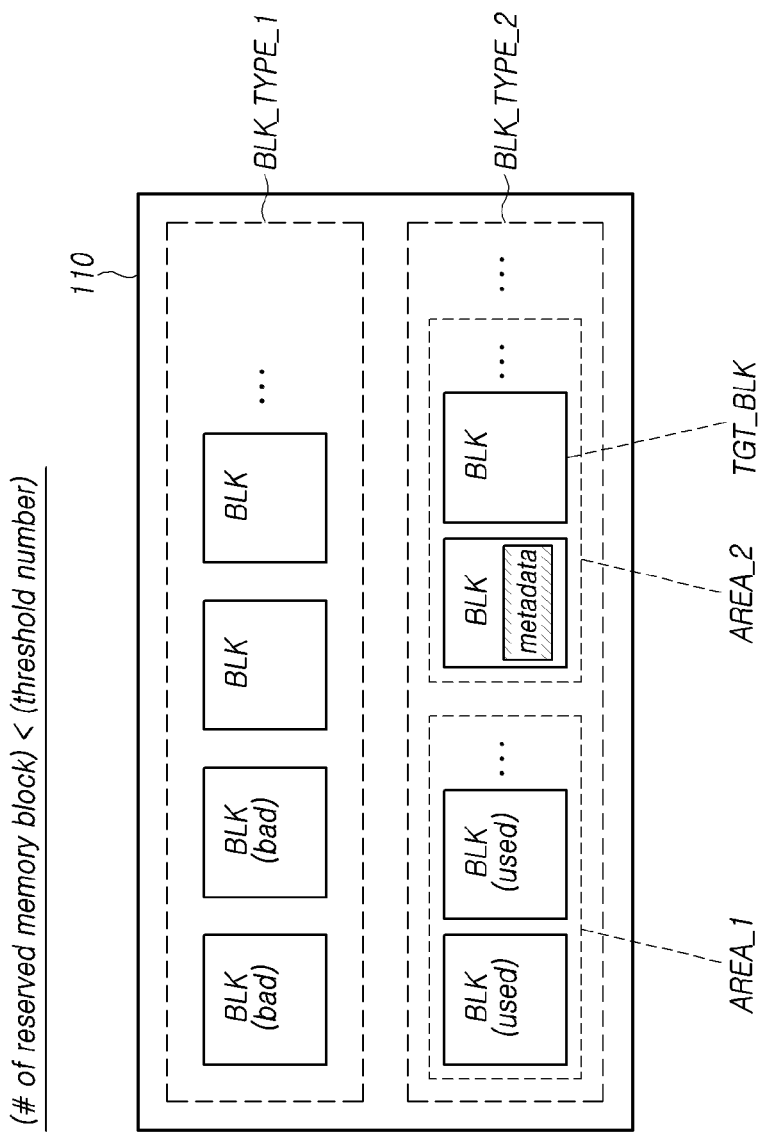
FIG. 10 illustrates an operation of selecting target memory blocks from a second memory area according to an embodiment of the present disclosure.

FIG. 10 illustrates an operation of selecting the target memory blocks TGT_BLK from the second memory area AREA_2 according to an embodiment of the present disclosure.

Referring to FIG. 10, when the number of reserved memory blocks described in FIG. 8 is less than the threshold number, the controller 120 of the storage device 100 may select the target memory blocks TGT_BLK from among the memory blocks included in the second memory area AREA_2.

In this case, the target memory blocks TGT_BLK may be free memory blocks, in which meta data is not currently stored, in the second memory area AREA_2.

Figure 11:
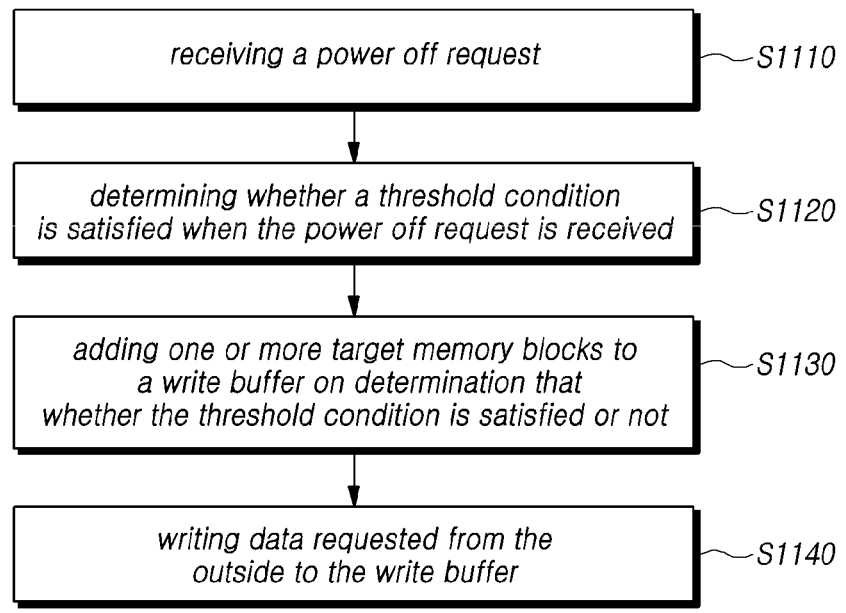
FIG. 11 illustrates a method of operating a storage device according to an embodiment of the present disclosure.

FIG. 11 illustrates a method of operating the storage device 100 of FIG. 3 according to an embodiment of the present disclosure.

Referring to FIG. 11, the storage device 100 may receive a power off request from the outside of the storage device 100 (S1110).

Whether a threshold condition is satisfied or not is determined when the power off request is received (S1120).

For example, it is determined that the threshold condition is satisfied when garbage collection is being executed for at least one of the first type memory blocks BLK_TYPE_1. The write buffer WR_BUF may include one or more of the plurality of first type memory blocks BLK_TYPE_1.

After that, one or more target memory blocks TGT_BLK are selected from among the second type memory blocks BLK_TYPE_2 and added to the write buffer WR_BUF according to whether the threshold condition is satisfied or not (S1130). The second type memory blocks BLK_TYPE_2 may operate at a higher speed than the first type memory blocks BLK_TYPE_1.

For example, a throughput of an operation of storing write data in the write buffer WR_BUF may be set to be less than or equal to a threshold throughput when it is determined that the threshold condition is satisfied. When the throughput of the operation of storing the write data in the write buffer WR_BUF is less than or equal to the threshold throughput, the one or more target memory blocks TGT_BLK are added to the write buffer WR_BUF.

In another embodiment, the target memory blocks TGT_BLK may be selected from at least one of the first memory area AREA_1 and the second memory area AREA_2.

At S1130, the number of reserved memory blocks in the first memory area AREA_1 is determined, and then a memory area for selecting the target memory blocks TGT_BLK is determined between the first memory area AREA_1 and the second memory area AREA_2 based on the number of reserved memory blocks.

For example, the determining of the memory area may include selecting the target memory blocks TGT_BLK from the first memory area AREA_1 when the number of reserved memory blocks is greater than or equal to a threshold number, and selecting the target memory blocks TGT_BLK from the second memory area AREA_2 when the number of reserved memory blocks is less than the threshold number.

After the target memory blocks TGT_BLK are set as the write buffer WR_BUF, i.e., the storage capacity of the write buffer WR_BUF is increased, data from the outside, i.e., write data, is written to the write buffer (S1140).

Although exemplary embodiments of the disclosure have been described for illustrative purposes, those skilled in the art will appreciate that various modifications, additions and substitutions are possible, without departing from the scope and spirit of the disclosure. Therefore, the embodiments disclosed above and in the accompanying drawings should be considered in a descriptive sense only and not for limiting the technological scope. The technological scope of the disclosure is not limited by the embodiments and the accompanying drawings. The spirit and scope of the disclosure should be interpreted in connection with the appended claims and encompass all equivalents falling within the scope of the appended claims.

What is claimed is:

1. A storage device comprising:
    a memory including a plurality of first type memory blocks and a plurality of second type memory blocks; and
    a controller configured to:
    determine a write buffer including at least one first type memory block among the plurality of first type memory blocks, the write buffer temporarily storing write data,
    add at least one target memory block selected from among the plurality of second type memory blocks to the write buffer when a power off request is received under a threshold condition,
    wherein the second type memory blocks operate at a higher speed than the first type memory blocks, and
    wherein the controller is configured to determine that the threshold condition is satisfied when garbage collection is being executed for the memory.

2. The storage device according to claim 1,
    wherein, when the threshold condition is satisfied, the controller is configured to set a throughput of an operation of storing write data in the write buffer to be less than or equal to a threshold throughput.

3. The storage device according to claim 1,
wherein the controller is configured to select the at least one target memory block from at least one of a first memory area and a second memory area, the first memory area including over-provisioning memory blocks among the second type memory blocks, the second memory area including memory blocks allocated to store meta data among the second type memory blocks.

4. The storage device according to claim 3,
wherein the controller is configured to:
select the at least one target memory block from the first memory area when a number of reserved memory blocks among the over-provisioning memory blocks is greater than or equal to a threshold number, and
select the at least one target memory block from the second memory area when the number of reserved memory blocks is less than the threshold number.

5. A method for operating a storage device, comprising:
receiving a power off request under a threshold condition;
adding at least one target memory block to a write buffer that includes at least one first type memory block among a plurality of first type memory blocks, the at least one target memory block being selected from among a plurality of second type memory blocks; and
storing write data in the write buffer,
wherein the second type memory blocks operate at a higher speed than the first type memory blocks, and
wherein it is determined that the threshold condition is satisfied when garbage collection is being executed for a memory including the plurality of first type memory blocks and the plurality of second type memory blocks.

6. The method according to claim 5,
wherein a throughput of an operation of storing write data in the write buffer is set to be less than or equal to a threshold throughput when the threshold condition is satisfied.

7. The method according to claim 5,
wherein the at least one target memory block is selected from at least one of a first memory area and a second memory area, the first memory area including over-provisioning memory blocks among the second type memory blocks, the second memory area including memory blocks allocated to store meta data among the second type memory blocks.

8. The method according to claim 7,
wherein the adding at least one target memory block comprises:
determining a number of reserved memory blocks among the over-provisioning memory blocks included in the first memory area; and
selecting the at least one target memory block from at least one of the first memory area and the second memory area based on the number of reserved memory blocks.

9. The method according to claim 8,
wherein the at least one target memory block is selected from the first memory area when the number of reserved memory blocks is greater than or equal to a threshold number, and the at least one target memory block is selected from the second memory area when the number of reserved memory blocks is less than the threshold number.

10. A controller comprising:
a memory interface configured to communicate with a memory including a plurality of first type memory blocks and a plurality of second type memory blocks; and
a control circuit configured to:
determine a write buffer including at least one first type memory block among the plurality of first type memory blocks, the write buffer temporarily storing write data from an external device,
add at least one target memory block selected from among the plurality of second type memory blocks to the write buffer when a power off request is received under a threshold condition,
wherein the second type memory blocks operate at a higher speed than the first type memory blocks, and
wherein the control circuit is configured to determine that the threshold condition is satisfied when garbage collection is being executed for the memory.

* * * * *